(12) United States Patent
Johnston (10) Patent No.: US 9,228,688 B2
(45) Date of Patent: Jan. 5, 2016

(54) SHOCK ATTENUATOR AND CLOSURE FOR SAME

(71) Applicant: Charles E. Johnston, Moses Lake, WA (US)

(72) Inventor: Charles E. Johnston, Moses Lake, WA (US)

( * ) Notice: Subject to any disclaimer, the term of this patent is extended or adjusted under 35 U.S.C. 154(b) by 0 days.

(21) Appl. No.: 14/347,157

(22) PCT Filed: Sep. 26, 2012

(86) PCT No.: PCT/US2012/057333
§ 371 (c)(1),
(2) Date: Mar. 25, 2014

(87) PCT Pub. No.: WO2013/049203
PCT Pub. Date: Apr. 4, 2013

(65) Prior Publication Data
US 2014/0224366 A1    Aug. 14, 2014

Related U.S. Application Data

(60) Provisional application No. 61/539,775, filed on Sep. 27, 2011.

(51) Int. Cl.
| | |
|---|---|
| *F16L 55/04* | (2006.01) |
| *F16L 55/05* | (2006.01) |
| *B26F 3/00* | (2006.01) |

(52) U.S. Cl.
CPC ................. *F16L 55/05* (2013.01); *B26F 3/004* (2013.01); *B26F 2003/006* (2013.01)

(58) Field of Classification Search
USPC ........................................ 138/26, 30, 109, 89
See application file for complete search history.

(56) References Cited

U.S. PATENT DOCUMENTS

| | | | | |
|---|---|---|---|---|
| 3,991,446 | A | * | 11/1976 | Mooney et al. ............... 411/548 |
| 4,461,322 | A | * | 7/1984 | Mills ................................ 138/31 |
| 4,514,151 | A | | 4/1985 | Anders et al. |
| 4,750,525 | A | * | 6/1988 | Vaughan .......................... 138/89 |
| 4,852,423 | A | * | 8/1989 | Mikami et al. ............... 74/551.9 |
| 5,201,343 | A | | 4/1993 | Zimmermann |

(Continued)

*Primary Examiner* — Patrick F Brinson
(74) *Attorney, Agent, or Firm* — Robert A. Seldon

(57) ABSTRACT

A shock attenuator capable for use with a high pressure fluid line at pressures experienced by waterjet cutting systems comprises an attenuator body having an internal generally axially-extending bore extending between end regions, at least one of which is open-ended. An end plug within the open-ended region of the bore seals the bore and has a though hole for accommodating a fitting for connection to a high pressure fluid line. A closure assembly for retaining the end plug within the bore includes a first plurality of generally radially-extending tabs extending from the attenuator body and circumferentially disposed about said axis, with each of said tabs of the first plurality being separated from the next tab by a respective gap. A second plurality of generally radially-extending tabs is coupled to the end plug and circumferentially disposed about said axis, with each of said tabs also being separated from the next tab by a respective gap. The second plurality of tabs is positioned for retention by said first plurality of tabs in such a way that the end plug is retained in the bore when subjected to the high pressure from high pressure fluid within the bore.

In one embodiment, the first plurality of tabs extends outward from the body's exterior to engage the second plurality of tabs extending inwardly from an end cap.

In another embodiment, the first plurality of tabs extends inwardly from the bore's wall to engage a second plurality of tabs extending outwardly from the end plug.

20 Claims, 6 Drawing Sheets

(56) References Cited

U.S. PATENT DOCUMENTS

| | | |
|---|---|---|
| 5,941,283 A | 8/1999 | Forte |
| 7,017,610 B2 * | 3/2006 | Zimpfer et al. ............... 138/30 |
| 8,079,386 B1 * | 12/2011 | Tsai et al. .................... 138/46 |
| 8,820,361 B2 * | 9/2014 | Kawasetsu et al. ........... 138/31 |
| 2002/0069921 A1 | 6/2002 | Zanardi |
| 2010/0133038 A1 | 6/2010 | Weber |

* cited by examiner

SHOCK ATTENUATOR AND CLOSURE FOR SAME

PRIORITY CLAIM AND INCORPORATION BY REFERENCE

This application claims priority of U.S. Provisional Patent Application 61/539,775 filed Sep. 27, 2011, the content of which is hereby incorporated by reference.

BACKGROUND

Shock attenuators are employed in ultra-high pressure waterjet cutting systems to smooth the unwanted pressure excursions caused by the reciprocating operation of the system's intensifier. These systems are typically operated to pressures in the 90,000 PSI (620,528 kPa) range, with the typical need for a minimum volume of 1.5 liters but a preferred volume of 2 liters to optimize the attenuator's effectiveness. As used herein, the term "waterjet cutting system" shall include abrasivejet cutting systems wherein abrasive is entrained into the waterjet.

The most economical design has been to use a heavy walled tubular container with a typical inside diameter of 2.375 inches (6 cm) and wetted area of 29 inches (187 cm) or greater. These parameters yield a 2 liter volume large enough to support a dual intensifier system with up to 100 horsepower (74.5 KW) input.

A cylinder with 2.375 inch (6 cm) diameter bore creates approximately 266,000 pounds of force (120 655.57 kg of force) against whatever objects are used to close the ends. This presents a twofold problem: first, the strength requirements due to the straight force loading the closure system and, second, the fatigue loading due to the cycling of the attenuator system, typically 10 to 50 times a day.

Existing attenuator systems employ a variety of mechanical closure methods: screw-in end plugs, end plugs held in with transverse retainer pins, multiple studs anchored in the attenuator body, and tie rods extending the length of the attenuator body. At the very high working pressures to which these attenuator systems are subjected, failure of the closures can have devastating consequences.

The use of screw-in type closure plugs present design problems which, to overcome, are expensive to manufacture. Improper designs can result, and in fact have resulted, in catastrophic failures of the closure system. An example of a catastrophic failure is where the seal material sealing the closure member to the attenuator body migrates into the thread area, increasing the load on the threads due to the thread's resulting maximum diameter being greater than the original (typically, 2.375 inch (6 cm)) seal diameter. A number of such failures are known to have occurred in the waterjet industry. While these failures have fortunately not resulted in any personnel injuries known to the inventor, structural damage has occurred due, for example, to the impact of the end closure parts with structures such as steel I-beams.

The use of six or eight high-strength studs or bolts instead of screw-in type closure plugs has proven to be the most cost-effective configuration, and has been less prone to catastrophic failure. However, there have been failures that resulted, in one case known to the inventor, in the end closure penetrating a twelve meter high roof. Such closures demonstrate through calculations that they can withstand the pressure loading. However fatigue problems, assembly problems and loosening of nuts or bolts can result in the over-loading of two or three of the studs. This damages the studs and causes stress levels in excess of the design limits, creating the possibility of catastrophic failure.

The systems can be complex or simple like the multiple bolt type, but they all have potential for catastrophic failure, including failures due to human error. Accordingly, there is a long-felt need for attenuators with closures that are highly reliable, cost-effective to manufacture and which minimize the chance for human error during assembly.

SUMMARY OF THE INVENTION

A shock attenuator capable for use with a high pressure fluid line at pressures experienced by waterjet cutting systems comprises an attenuator body having an internal generally axially-extending bore extending between end regions, at least one of which is open-ended. An end plug is disposed within the open-ended region of the bore to seal the bore. The end plug has a though-hole for accommodating a fitting in fluid communication between the bore and a high pressure fluid line. A closure assembly retains the end plug within the bore, and includes a first plurality of generally radially-extending tabs extending from the attenuator body and circumferentially disposed about said axis, with each of said tabs of the first plurality being separated from the next tab by a respective gap, and a second plurality of generally radially-extending tabs coupled to the end plug and circumferentially disposed about said axis, with each of said tabs being separated from the next tab of the second plurality by a respective gap. Said second plurality of tabs is positioned for retention by the first plurality of tabs in such a way that the end plug is retained in the bore when subjected to the high pressure from high pressure fluid within the bore.

These and further details of the invention will be apparent to those of ordinary skill in the art from reading a description of the preferred embodiment of the invention described below, of which the drawing forms a part.

DETAILED DESCRIPTION OF THE PREFERRED EMBODIMENT

As will be clear below, there are alternative configurations of a preferred attenuators constructed in accordance with the invention. One alternative will be referred to below as the "externally locked" configuration, and the other will be referred to as the "internally locked" configuration.

Externally Locked Configuration

Figure 1:
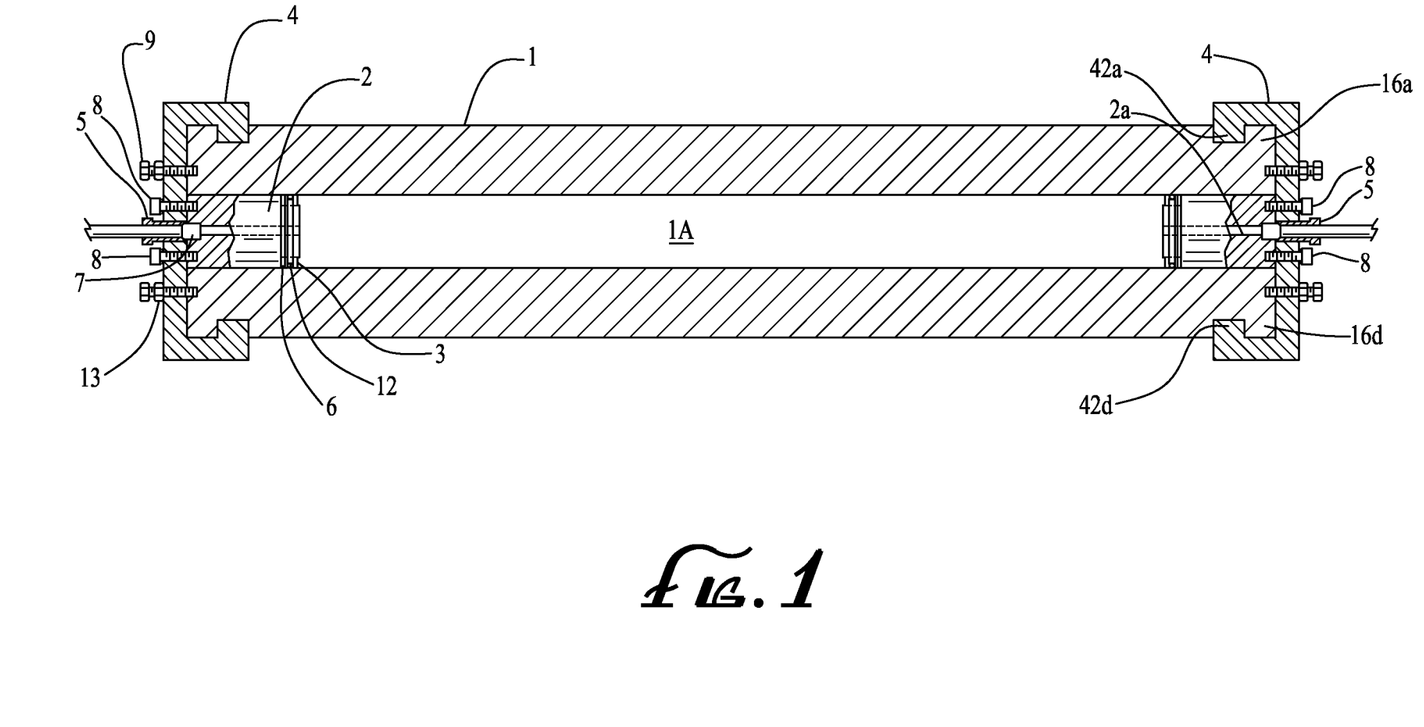
FIG. 1 is a longitudinal section drawing of a shock attenuator constructed in accordance with the invention.

FIG. 1 shows a preferred attenuator body 1 having an internal bore 1A communicating between opposing ends. Male end plugs 2 are installed at those opposite ends of the body to close the bore.

The attenuator body is closed at each end by a respective end cap 4 having a through-hole 4A through which fluid communication with the bore is enabled via a fitting hereinafter described. The fitting at each end permits the ingress of fluid at one end of the attenuator body (the "inlet") and the egress of fluid at the other end (the "outlet"). It may be noted, and it is known to those of ordinary skill in the art, that the fluid does not necessarily flow through the attenuator; the attenuator can be "T-ed" into the high pressure plumbing with the opposite end of the attenuator blocked, so that one end serves as both an inlet and an outlet passage for the fluid as the fluid pressure in the plumbing varies from the desired value. It should accordingly be understood that an attenuator having either configuration is within the scope of the invention, despite the fact that an outlet at the second end is described and illustrated herein.

Figure 2A:
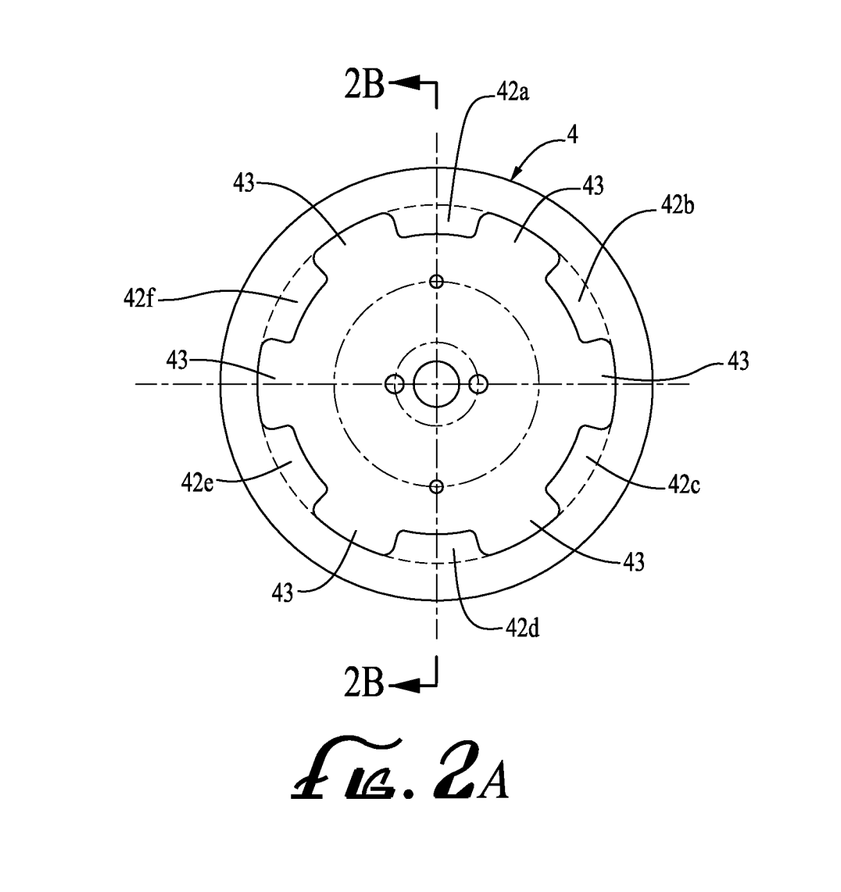
FIG. 2A is a right side elevation view of the right end cap of FIG. 1.
Figure 2B:
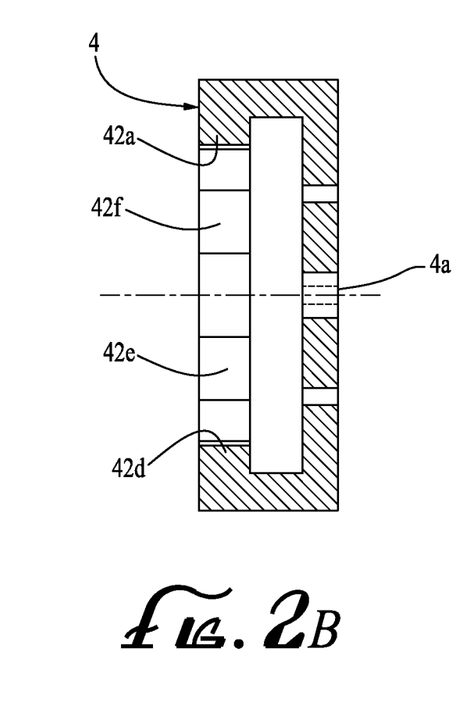
FIG. 2B is a sectional view of the end cap of FIG. 2A taken along line 2B-2B therein.

FIG. 2A is a right side elevation view of the right end cap 4 of FIG. 1, while FIG. 2B is a sectional view of the end cap of FIG. 2A taken along line 2B-2B therein. Preferably, the left end cap is a mirror image of the right end cap. As shown in FIGS. 2A and 2B, the end cap 4 has a plurality of circumferentially-spaced, radially-extending tabs 42a-f that each extend radially inward from its peripheral region. Adjacent tabs are separated by a respective one of a plurality of circumferentially-spaced notches 43. The tabs are used to inter-engage tabs formed on the attenuator body, as best explained with respect to FIGS. 3A and 3B.

Figure 3A:
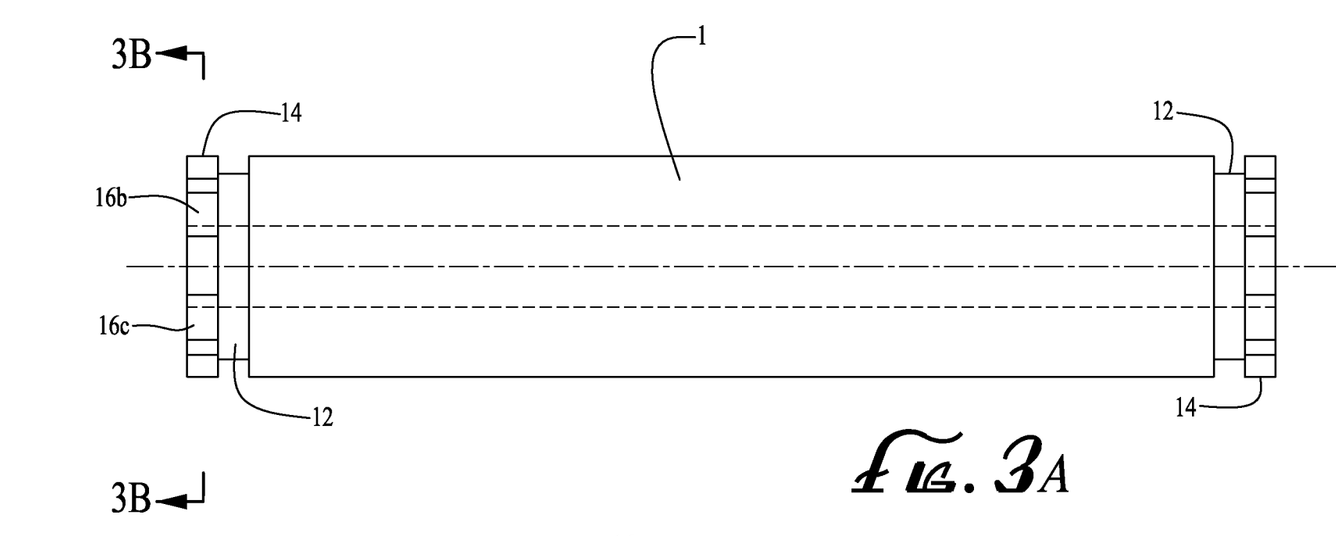
FIG. 3A is a front elevation view of the shock attenuator of FIG. 1.
Figure 3B:
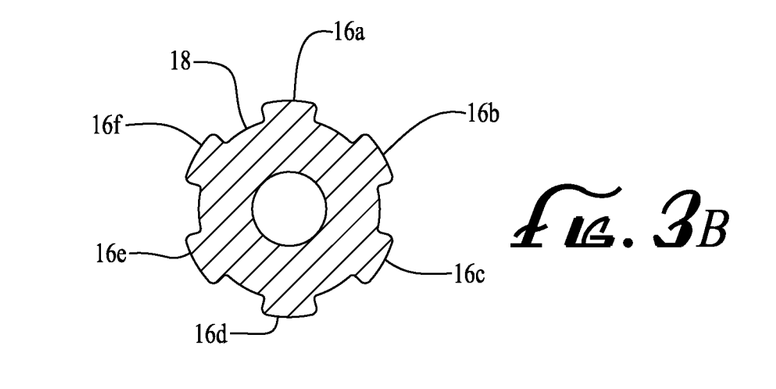
FIG. 3B is a section view of the attenuator taken along line 3B-3B in FIG. 3A.

FIG. 3A is a front elevation view of the shock attenuator of FIG. 1, while FIG. 3B is a section view of the attenuator taken along line 3B-3B in FIG. 3A. As illustrated in FIG. 3A, the attenuator body 1 has a neck 12 of reduced outer diameter adjacent each end region of the attenuator. The neck 12 lies interjacent its respective end region 14 and the main segment of the body. The end region 14 is illustrated in FIG. 3B as having a plurality of circumferentially-spaced, radially-extending tabs 16a-f that extend radially outward from the attenuator body. Adjacent tabs 16a-f are separated by a respective one of a plurality of circumferentially-spaced notches 18. The tabs 14a-f are used to inter-engage tabs 42a-f on the cap during assembly of the attenuator, as explained below.

In assembling the end caps onto the attenuator, the notches 43 of the end cap are aligned with the tabs 16a-f of the attenuator body as the cap is slid onto the end of the body. The cap is then rotated so that each tab 42a-f of the cap inter-engages the back side of a respective tab 16a-f of the attenuator body to reversibly affix the cap in place and capture a plug 2 within the end region of the bore. This is repeated at the other end of the attenuator as well. Those skilled in the art will recognize that one or more selected tabs can be oversized (or undersized) with respect to the others to match similarly oversized (or undersized) notches through which they fit during the mounting of the cap onto the attenuator body, if one wishes the cap to be placed on the attenuator only in a predetermined orientation.

Returning to FIG. 1, the plug 2 at each end of the attenuator's bore seals the bore. Sealing of the bore is preferably accomplished at each end using a three piece seal which comprises a generally annular plastic seal 3 with a stainless steel anti-extrusion ring 6. Mounted on the seal body between the seal 3 and ring 6 is an o-ring 12 to energize the seal assembly to begin sealing at a low pressure. The end plug 2 is preferably machined with a radial tang (see FIG. 4D) to retain the seal 3 on the end plug during operation and service procedures.

As illustrated in FIG. 1, the plug 2 has a generally central through-hole 2a through which an accommodated fitting 5 permits the bore to be connected to a high pressure fluid line to allow the ingress or egress of fluid into and out of the bore. Once mounted to the attenuator and rotated to inter-engage the tabs, the rotational position of the end cap relative the body 1 is can be further secured to increase the safety factor by providing two tapped holes, each accepting a screw 9 that passes through a fastener nut 13 and the cap to engage a corresponding hole in the body 1. Engagement of the screw with the attenuator body locks the end cap, preventing rotation.

Two additional tapped holes can be provided for screws 8 to force the end plug to its operating, fully extended position. These two tapped holes in the end plug also can be used by a service person to pull the end plug 2 from the bore.

Other means can be utilized to secure the cap against rotation after mounting on the actuator body without departing from the scope of the invention. For example, and not by way of limitation, an automatic locking device comprising two spring loaded fingers associated with the attenuator body can be used to trap an end cap tab and prevent the end cap from rotating out of the closed position; the structure of such a configuration is analogous to the manner by which the bottom portion of a beach umbrella's pole is secured to the top portion of the pole with the use of a spring-loaded finger or ball fitting within a hole aligned therewith to prevent separation and/or relative rotation of the two pieces.

Those of ordinary skill in the art will recognize that the presence of a very high pressure fluid within the bore of the attenuator will cause the tabs of the end caps to press longitudinally outwardly against the tabs of the attenuator body, distributing the load over the total surface area of the tab plurality. The end plug is thereby retained in the bore when subjected to the high pressure from high pressure fluid within the bore. As the high pressure fluid presses the plug against the end cap, the plug is retained within the bore by the attenuator body's tabs acting on the end caps' tabs which are, in turn, effectively coupled to the plug via the end caps contact with the plug. The number of tabs need not be the number illustrated, so long as appropriate design specifications are met for the system's working pressure.

Internally-Locked Configuration

Figure 4A:
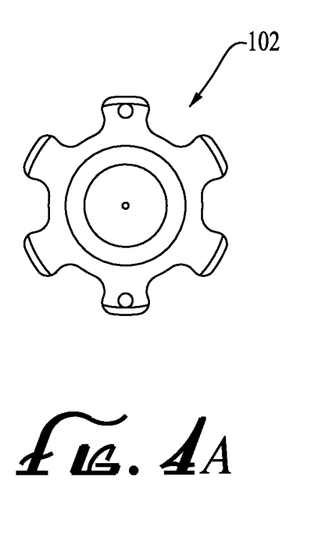
FIG. 4A is left side elevation view of an alternative preferred plug configuration used in an attenuator constructed in accordance with the invention.
Figures 4B, 4D:
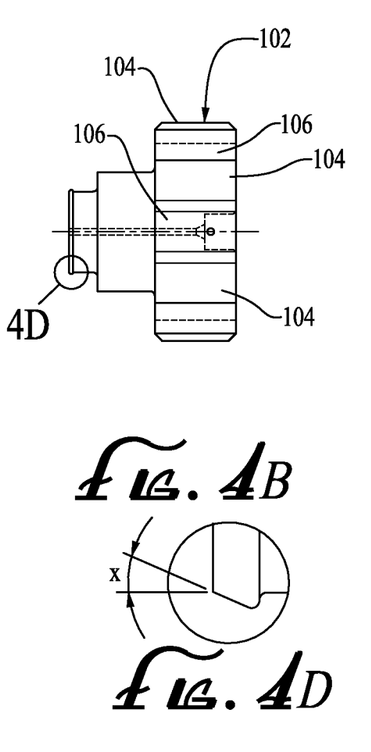
FIG. 4B is front elevation view of the plug of FIG. 4A.
FIG. 4D is an enlarged detail drawing of the region 4D in FIG. 4B.
Figure 4C:
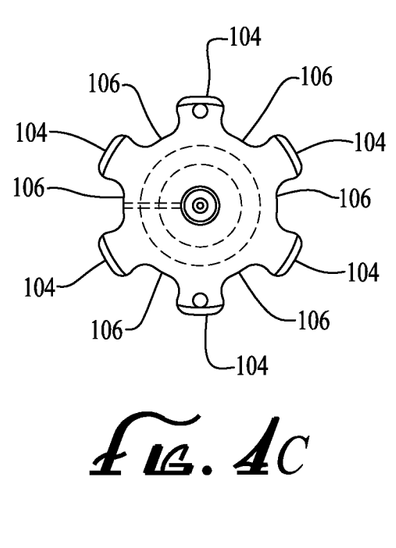
FIG. 4C is a right side elevation view of the plug of FIGS. 4A-B.
Figures 5A, 5B:
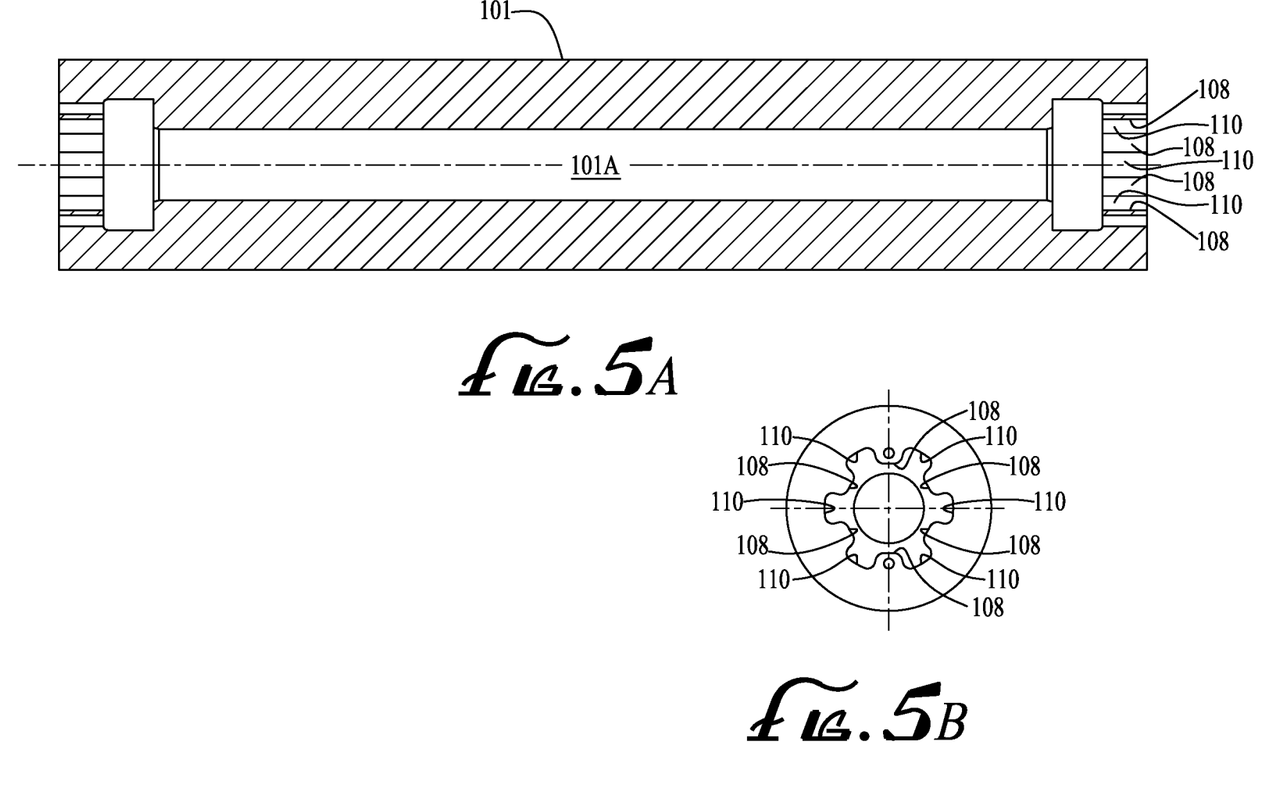
FIG. 5A is a longitudinal section drawing of an alternative preferred embodiment of a shock attenuator body constructed in accordance with the invention.
FIG. 5B is a right side elevation view of the attenuator body of FIG. 5A.
Figure 6:
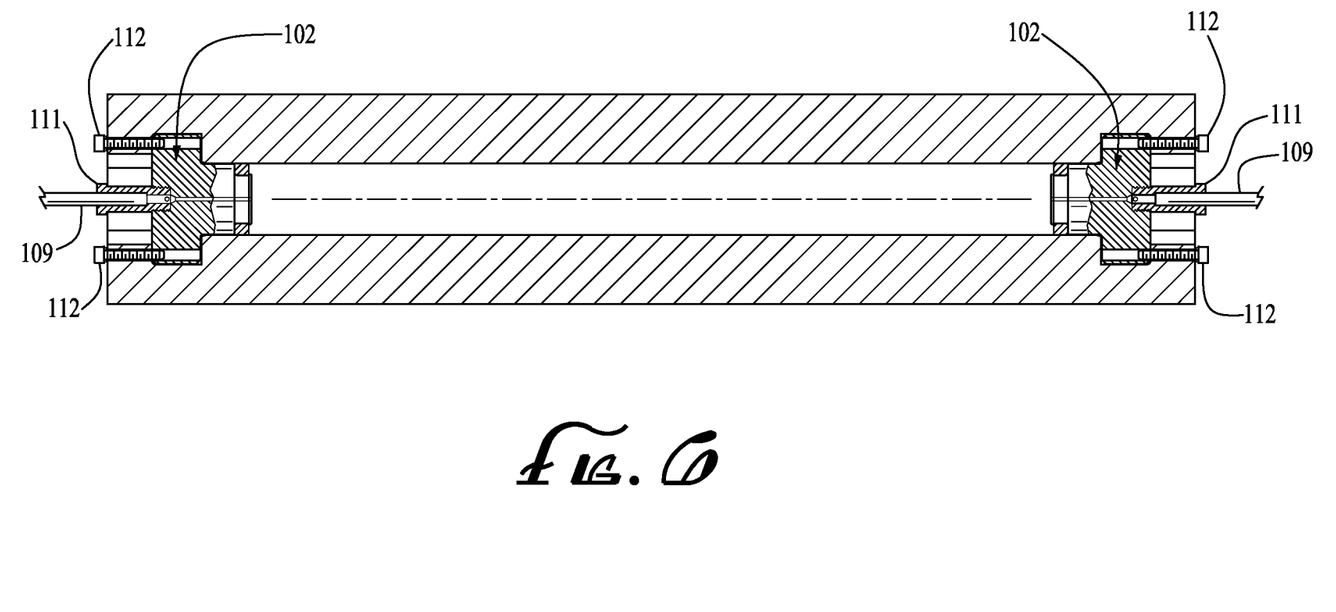
FIG. 6 is a longitudinal sectional view of shock attenuator body of FIGS. 5A-B with the plug of FIGS. 4A-C therein

In the internally-locked configuration, the interlocking tabs are within the attenuator body instead of externally located. Here, as illustrated in FIGS. 4A-C, a preferred plug 102 is similar to plug 2 (FIG. 1), but provided with a head comprising a plurality of circumferentially-spaced, radially-extending tabs 104 separated by interjacent circumferentially spaced notches 106. As illustrated in FIGS. 5A-B, the end regions of the attenuator's internal bore 101A contains a plurality of circumferentially-spaced, radially-inward extending tabs 108 separated by interjacent notches 110 similar in configuration to those described and illustrated with respect to the embodiment of FIGS. 1-3. Here, the plug is inserted into the bore so that its tabs pass through the notches extending from the wall of the bore through which it passes, and the plug is rotated to interengage its tabs with those associated with the bore. The resulting configuration is illustrated in FIG. 6.

Because the plug itself not only seals the bore but additionally resists the outwardly-directed high pressure within the bore, the end caps can be a simple cap of planar or other desired shape that merely masks the plug from view while permitting fluid lines 109 to be coupled to the bore via a fitting 111 extending from the plugs. The plug can be secured against rotation by screws 112 passing though aligned holes in the cap and plug and/or by spring-loaded fingers as previously described.

The illustrated configurations result in a shock attenuator and end closure system that are not subject to catastrophic failure due to a personnel procedural error, that have a factor of safety greater than two, and that are relatively easy to manufacture owing to its simplicity of design. To eliminate the possibility of an overload on the closure mechanism, no threaded retainer method is allowed in the interior of the cylinder.

Preventing operator procedural error is accomplished by eliminating multiple retainers, making it impossible for retainers to become loose and cause loading of the other retainers beyond design limits.

If one or more tabs and their respective receiving-notches are of different sizes, it is impossible for the assembler to insert the end cap in a position where the locking dogs do not engage their receiving holes. Additional safety is added with a lock screw or pawl that must be physically moved to allow the end cap to rotate into a position of disengagement.

The resulting attenuator configuration, when configured in accordance with the preferred embodiment, is believed to be characterized by a closure having the high margin of safety needed for applications such as high pressure waterjet systems. The closure system can provide an automatic locking device to prevent accidental opening. A symmetrical design does not pose the possibility of unsymmetrical loading that could cause stresses in the mechanism that could eliminate its ability to retain the end plug in place. Further, the preferred interlocking system with assembly keying prevents improper assembly, and a seal retention tang on the end closure plug prevents the seal from migrating away from the correct operating position. The result is a closure system that is simple in operation yet much more effective and safer than earlier designs.

Although the present invention and its advantages have been described in detail, it should be understood that various changes, substitutions and alterations can be made herein without departing from the spirit and scope of the invention as will be defined by appended claims.

I claim:

1. A shock attenuator capable for use with a high pressure fluid line at pressures experienced by waterjet cutting systems, and comprising:
    an attenuator body having an internal generally axially-extending bore extending between end regions, at least one of which is open-ended;
    an end plug disposed within the open-ended region of the bore to seal the bore, said end plug having a though hole for accommodating a fitting in fluid communication between the bore and the high pressure fluid line;
    a closure assembly for retaining the end plug within the bore, the closure assembly including
    a first plurality of generally radially-extending tabs extending from the attenuator body and circumferentially disposed about said axis, with each of said tabs of the first plurality being separated from the next tab by a respective gap, and
    a second plurality of generally radially-extending tabs coupled to the end plug and circumferentially disposed about said axis, with each of said tabs being separated from the next tab of the second plurality by a respective gap, said second plurality of tabs positioned for retention by said first plurality of tabs in such a way that the end plug is retained in the bore when subjected to the high pressure from high pressure fluid within the bore.

2. The shock attenuator of claim 1 including an end cap mounted to the attenuator body and positioned to retain the end plug within the bore, and wherein
    the first plurality of tabs extend radially outward from the attenuator body,
    the second plurality of tabs extend radially inward from the end cap so as to engage the first plurality of tabs of the mounted end cap in such a way that the first plurality of tabs prevents the end cap from being displaced from the attenuator body by high pressure fluid within the bore.

3. The shock attenuator of claim 2 wherein the tabs and gaps of the first and second pluralities are dimensioned in such a way that the tabs of the first plurality fit within at least some of the gaps of the second plurality as the end cap is mounted to the attenuator, with subsequent rotation of the end cap with respect to the attenuator body causing said engagement of the first and second pluralities of tabs.

4. The shock attenuator of claim 3 wherein at least one tab of one of the pluralities is dimensioned differently from others to match a gap in the other of the pluralities during mounting of the cap onto the attenuator body so as to permit the cap to be mounted only in a predetermined orientation.

5. The shock attenuator of claim 1 wherein the end plug includes a generally annular plastic seal mounted around the plug, and an anti-extrusion ring mounted about the plug between the plastic seal and the end cap.

6. The shock attenuator of claim 5 wherein the end plug further includes an O-ring mounted about the plug between the plastic seal and the anti-extrusion ring.

7. The shock attenuator of claim 5 wherein the plug includes a radial tang to retain the plastic seal on the end plug during operation of the attenuator.

8. The shock attenuator of claim 3 wherein the mounted end cap and attenuator body have mutually aligned holes for accepting a removable fastener that passes through the end cap to prevent rotation of the mounted end cap.

9. The shock attenuator of claim 3 wherein the mounted end cap and end plug have mutually aligned holes for accepting a fastener that passes through the end cap secure the plug to the end cap.

10. The shock attenuator of claim 3 including a spring-loaded detent mechanism associated with the attenuator body and end cap to releasably trap the mounted end cap in position and prevent the mounted end cap from rotating out of position.

11. The shock actuator of claim 1 wherein the first plurality of tabs extend radially inward from the attenuator body into the bore,
    the second plurality of tabs extend radially outward from the end plug so as to engage the first plurality of tabs in such a way that the first plurality of tabs prevents the end plug from being displaced from the bore by high pressure fluid within the bore.

12. The attenuator of claim 11 wherein the end plug has a head end having a plurality of circumferentially-spaced, radially-extending tabs separated by interjacent circumferentially spaced gaps.

13. The attenuator of claim 11 wherein the tabs and gaps of the first plurality are sized and positioned with respect to the tabs and gaps of the second plurality so that as the end plug is inserted into the bore, its tabs pass through the gaps extending from the attenuator body and, upon being rotated after insertion, its tabs engage tabs extending from the attenuator body in such a way that the first plurality of tabs prevents the end plug from being displaced from the attenuator body by high pressure fluid within the bore.

14. The shock attenuator of claim 13 wherein at least one tab of one of the pluralities is dimensioned differently from others to match a gap in the other of the pluralities during insertion of the end plug into the bore so as to permit the end plug to be inserted only in a predetermined orientation.

15. The shock attenuator of claim 11 wherein the end plug includes a generally annular plastic seal mounted around the plug, and an anti-extrusion ring mounted about the plug between the plastic seal and the end cap.

16. The shock attenuator of claim 15 wherein the end plug further includes an O-ring mounted about the plug between the plastic seal and the anti-extrusion ring.

17. The shock attenuator of claim 15 wherein the plug includes a radial tang to retain the plastic seal on the end plug during operation of the attenuator.

18. The shock attenuator of claim 11 wherein the mounted end cap and end plug have mutually aligned holes for accepting a removable fastener that passes through the end cap to prevent rotation of the inserted end plug.

19. The shock attenuator of claim 11 wherein the mounted end cap and end plug have mutually aligned holes for accepting a fastener that passes through the end cap secure the plug to the end cap.

20. The shock attenuator of claim 11 including a spring-loaded detent mechanism associated with the attenuator body and end cap to releasably trap the mounted end cap in position and prevent the mounted end cap from rotating out of position.

\* \* \* \* \*